(12) United States Patent
Wolff

(10) Patent No.: US 9,173,412 B2
(45) Date of Patent: *Nov. 3, 2015

(54) VENTURI EFFECT TECHNOLOGY ON A FOOD PRODUCT MOLDING MACHINE

(75) Inventor: James B. Wolff, Portland, OR (US)

(73) Assignee: Formtec, LLC., Sheboygan, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,400

(22) Filed: Sep. 12, 2012

(65) Prior Publication Data

US 2013/0084350 A1 Apr. 4, 2013

Related U.S. Application Data

(63) Continuation-in-part of application No. 13/199,910, filed on Sep. 12, 2011, now Pat. No. 8,985,993, and a continuation-in-part of application No. 13/374,441, filed on Dec. 29, 2011, and a continuation-in-part of application No. 13/374,421, filed on Dec. 27, 2011, and a continuation-in-part of application No. 13/374,423, filed on Dec. 27, 2011.

(51) Int. Cl.
| | |
|---|---|
| *B29C 47/00* | (2006.01) |
| *A22C 7/00* | (2006.01) |
| *A23P 1/10* | (2006.01) |
| *A23P 1/12* | (2006.01) |
| *A47J 43/20* | (2006.01) |

(52) U.S. Cl.
CPC ............... *A22C 7/00* (2013.01); *A22C 7/0076* (2013.01); *A22C 7/0084* (2013.01); *A23P 1/10* (2013.01); *A23P 1/12* (2013.01); *A47J 43/20* (2013.01)

(58) Field of Classification Search
CPC .. A22C 18/00; A22C 17/002; A22C 17/0006; A22C 5/00; A22C 7/0076; A22C 7/00; A22C 7/0007; A22C 7/0084; A22C 17/00; A22C 11/00; A23P 1/105; A23P 1/12; A23P 1/10; A47J 43/20; B02C 23/08; B02C 18/365; B02C 18/30; B02C 18/308
USPC ............. 425/553, 575, 546, 382 R, 449, 573, 425/587, 572, 812, 574, 197–199, 420, 542, 425/377; 426/512–513
See application file for complete search history.

(56) References Cited

U.S. PATENT DOCUMENTS

| | | | | |
|---|---|---|---|---|
| 3,793,466 | A * | 2/1974 | Kawkins et al. | 26/274 |
| 3,903,315 | A * | 9/1975 | Giles et al. | 426/388 |
| 4,356,595 | A * | 11/1982 | Sandberg et al. | 426/512 |
| 4,608,731 | A * | 9/1986 | Holly | 426/513 |
| 4,716,953 | A * | 1/1988 | Prunty et al. | 164/200 |
| 4,821,376 | A * | 4/1989 | Sandberg | 425/562 |
| 6,319,538 | B1 * | 11/2001 | Sheehy | 426/646 |
| 6,375,997 | B1 * | 4/2002 | Sheen et al. | 426/283 |
| 6,416,314 | B1 * | 7/2002 | LaBruno | 425/546 |
| 7,862,330 | B2 * | 1/2011 | Hansen et al. | 425/573 |
| 2005/0153039 | A1 * | 7/2005 | Gosz et al. | 426/512 |
| 2008/0089971 | A1 * | 4/2008 | Sandberg et al. | 425/430 |

FOREIGN PATENT DOCUMENTS

EP 720816 A1 * 7/1996 ............. A22C 11/00

* cited by examiner

*Primary Examiner* — Yogendra Gupta
*Assistant Examiner* — Ninh Le
(74) *Attorney, Agent, or Firm* — Philip M. Weiss; Weiss & Weiss

(57) ABSTRACT

An apparatus and method for creating a venturi effect in a food product molding machine. The venturi effect accelerates food product in order to cause the product to be stretched aligning the fibers of the product.

9 Claims, 9 Drawing Sheets

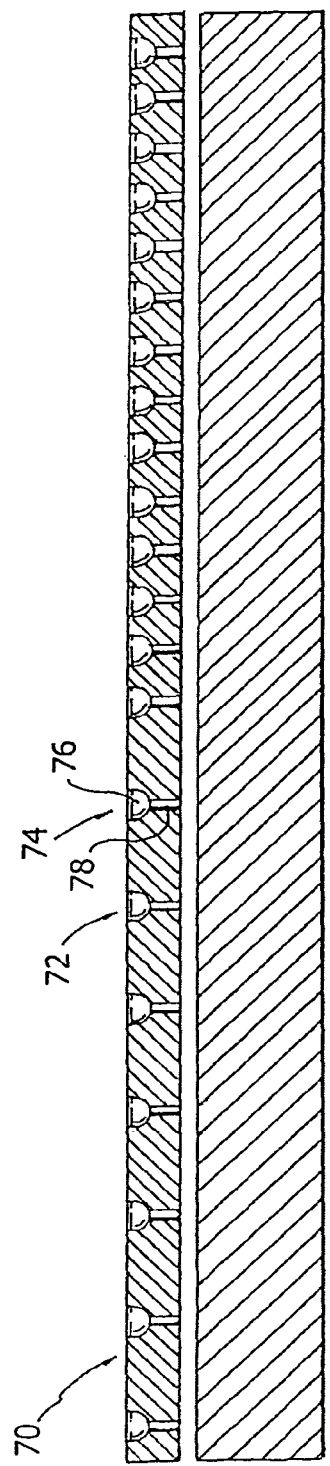
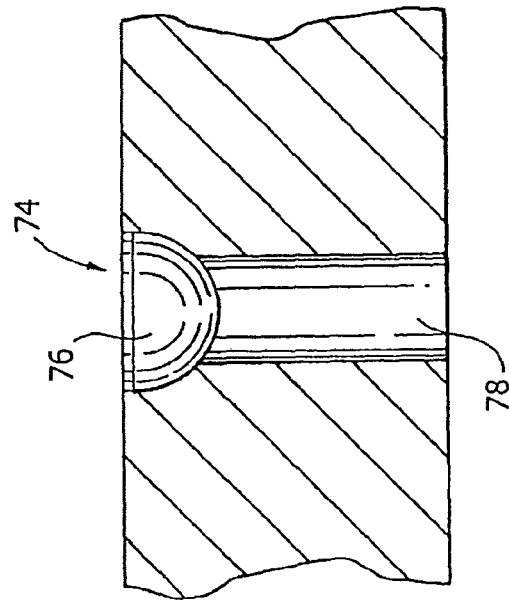

VENTURI EFFECT TECHNOLOGY ON A FOOD PRODUCT MOLDING MACHINE

RELATED APPLICATIONS

The present application is a continuation-in-part of application Ser. No. 13/199,910, filed on Sep. 12, 2011 now U.S. Pat. No. 8,985,993, which is a continuation in part of application Ser. No. 13/374,441, filed on Dec. 29, 2011, which is a continuation in part of application Ser. No. 13/374,421, filed on Dec. 27, 2011, which is a continuation in part of application Ser. No. 13/374,423, filed on Dec. 27, 2011.

FIELD OF THE INVENTION

The present invention relates to an apparatus and method for creating a venturi effect in a food product molding machine. The venturi effect accelerates food product in order to cause the product to be stretched aligning the fibers of the product.

BACKGROUND OF THE INVENTION

Current forming technology relies on high pressure, speed and complicated material flow pathways which produce a product lacking in quality. High pressure works the meat cells, the higher the pressure the more massaging or squeezing of the meat cells takes place. High speed combined with a complicated flow path massages and works the meat product, releasing myosin/actin from the cells causing the muscle fiber to bind together and contract (protein bind). The contraction takes place during high heat application as in cooking. The action of the meat fiber is to contract in length, this contraction combined with protein bind not only shortens the muscle fiber which if not controlled causes odd cook shapes but a rubber like texture with a tough bite.

In muscle, actin is the major component of thin filaments, which together with the motor protein myosin (which forms thick filaments), are arranged into actomyosin myofibrils. These fibrils comprise the mechanism of muscle contraction. Using the hydrolysis of ATP for energy, myosin heads undergo a cycle during which they attach to thin filaments, exerting a tension, and then depending on the load, perform a power stroke that causes the thin filaments to slide past, shortening the muscle.

Muscle fibril structure is measured from micrometers to several millimeters in length. These fibril structures are bundled together to form muscles. Myofibril proteins are the largest group and probably more is known about these proteins than any other. In muscle cells actin is the scaffold on which myosin proteins generate force to support muscle contraction. Myosin is the major protein that is extracted from the muscle cells by mechanical means.

An important purpose of tumbling and massaging is to solubiliize and extract myofibril proteins to produce a protein exudate on the surface of the meat. The exudates bind the formed pieces together upon heating. Binding strength also increases with increased massaging or blending time. This is due to increased exudate formation on the surface of the meat. Crude myosin extraction is increased with increased blending time.

Grinding/chopping utilizes the concept of rupturing the cell to release protein. This mechanical chopping or shearing takes place at the shear/fill plate hole. This process extracts myosin from muscle cells.

Mixing, utilizes friction and kinetic energy to release protein exudate. Fill hole shape and spacing can cause dead spots and turbulence in the meat flow. This change of direction is a form of mixing and massaging. This is another process, which extracts myosin from muscle cells.

Massaging takes place almost anywhere meat comes in contact with processing equipment and is moved or has a change of direction via pressure. This is also a procedure which involves extracting myosin from muscle cells.

SUMMARY OF THE INVENTION

It is an object of the present invention for the fiber orientation technology to reduce the release and mixing of myosin with actin. It is an object of the present invention for the fiber orientation technology to control orientation of the fiber. It is an object of the present invention for the fiber orientation technology to provide less myosin activity resulting in a better bite/bind and control over the final cook shape.

The present invention relates to an apparatus and method for accelerating food product in order to cause the product to be stretched aligning the fibers of the product. It is an object of the present invention for a hole or orifice to change size from a larger to a smaller diameter with vertical or concave sides. It is an object of the present invention for the said to have a sharp edge. The principle has design similarities to a venturi. It is referred to as a nozzle, venturi, orifice, or a restriction to flow which results in product acceleration with a corresponding pressure drop through the orifice.

By reducing the cross-sectional area of a tube through which a substance passes, the velocity is increased. This is the principle of Conservation of Mass. When the velocity increases the pressure of the material is reduced. This is the principle of the Conservation of Energy.

For every liquid, there is a ratio between the cross-sectional area (C) and the cross-sectional area (c) through which velocity can only be increased by reducing temperature or increasing pressure. Although ground meat is not a homogeneous liquid, the same concepts still apply. It is impossible to attain venturi effect unless there is a transition between the orifices and the small orifice has a finite length.

A venturi allows a smooth transition from a larger orifice to a smaller one. This transition minimizes flow transitions and thereby reduces restrictions in the system. The transition minimizes energy loss and supports fiber alignment.

The transition in a venturi is extremely difficult to create in a production tooling environment. As a result, using the geometric properties of a sphere or similar shape allows the ability to obtain many of the venturi effect properties using standard production practices.

All points on a sphere are the same distance from a fixed point. Contours and plane sections of spheres are circles. Spheres have the same width and girth. Spheres have maximum volume with minimum surface area. All of the above properties allow meat to flow with minimum interruptions. There are no static or dead zones. No matter what angle the cylinder intersects the sphere, the cross section is always a perfect circle.

It is an object of the present invention to have a spherical geometry or a similar shape in a fill or stripper plate to create venturi effects.

It is an object of the present invention to increase food product velocity forcing linear fiber alignment.

It is an object of the present invention to have spherical geometry or a similar shape in breather plate to create venturi effects.

It is an object of the present invention for the process to make a patty cool uniformly and soften texture/bite of the product.

The present invention relates to a food molding machine having a breather plate. A breather plate normally has a thickness less than 3/16" in the area of the breather holes. A breather plate is positioned adjacent to the mold plate and opposite the fill slot plate. The breather plate is designed to evacuate air from the patty cavities and collect and route excess food matter back to a food supply source. The breather plate contains various ports which allow evacuation of air and accumulation of excess food matter from the filled patty cavities. The ports feed into a channel of openings which is cut into the back side of the breather plate.

A breather plate sits adjacent to the mold plate on the opposite side of the fill slot, and slideably engages the mold plate. The breather plate includes at least one air pressure release passage, wherein a plurality of small breather holes enable the cavities of the mold plate to fluidly communicate with the passage. The air passage enables air in the cavities to escape as the machine pumps the cavities full of meat. The mold cover plate is adjacent the breather plate and its associated passage.

In the current breather plate designs there is a resistance to forming the patties wherein evacuate out of the holes in the breather plate. In the case of prior art breather plates, the orifices are cylindrical and vary in number of orifices and diameters.

This air flow can be accelerated by using a system which will reduce the cylinder size. Using the equation from Bernoulli's law of $A_1V_1=A_2V_2$, the velocity is increased by reducing the cross sectional area.

The typical way of accomplishing this is the use of a venturi nozzle. However, a venturi requires a gradual area reduction and a finite length throat. Given the restrictions of the plate thickness in the breathing area, it is not feasible to put current venturi designs in a breather plate.

However, utilizing the properties of a sphere, the air can achieve acceleration by intersecting a cylinder with a sphere of a larger diameter.

In a sphere pressure is equal in all directions. Therefore, when the sphere is intersected by a cylinder, the air will move in a direction coaxial with the cylinder at a high velocity. The impact on the meat particles in the breather system is greater because air moving at a higher velocity will generate more momentum.

It is an object of the present invention to provide a venturi effect in the hole by creating a sphere to cylinder hole. This creates a venturi effect or a venturi pump. This accelerates the product through the hole. It is an object of the invention for this to create a self-cleaning breather plate. The spherical cut creates equal pressure in all directions. It is an object of the present invention to have a spherical hemisphere or curved structure which has a diameter which is no greater than the choke flow for the liquid gas or solid used and is no less than the diameter of the connected cylindrical portion. It is an object of the present invention for the spherical hemisphere or curved structure to have a diameter between 1.1 to 2.5 times greater than a cylindrical portion which intersects the same. It is preferred to have a sharper edge from the edge to the hole.

The present invention relates to a food molding machine having a mold plate and at least one mold cavity therein. A mold plate drive is connected to the mold plate for driving the mold plate along a given path, and a repetitive cycle, between a fill position and a discharge position. A food pump is provided for pumping a moldable food product through a fill passage connecting the food pump to the mold cavity when the mold plate is in the fill position. A fill plate, interposed in the fill passage adjacent to the mold plate has a fill slot, fill horn, or multiplicity of fill orifices distributed in a predetermined pattern throughout an area aligned with the mold cavity when the mold plate is in fill position. It is an object of the present invention for the fill orifices to define paths through the fill plate, wherein some of the paths each have a path portion obliquely angled or perpendicular to the fill side of the mold plate. It is an object of the present invention for the paths to comprise spherical intersections or a curved structure. It is an object of the present invention to have a spherical hemisphere or curved structure which has a diameter which is no greater than the choke flow for the liquid gas or solid used and is no less than the diameter of the connected cylindrical portion. It is an object of the present invention for the side of the fill plate which is in contact with the stripper plate to comprise a spherical hemisphere or curved structure which has a diameter between approximately 1.1 to 2.5 times greater than a cylindrical portion which intersect the top of the mold plate perpendicularly or at an angle of less than or equal to about +/−75 degrees, or about +/−45 degrees in a preferred embodiment as measured from vertical in the longitudinal direction of the mold plate. By a reduction in the diameter a "venturi" condition is created. By using spherical sections or a curved structure, intersections between cylinder and spheres or curved structures create transitions which can be manufactured whose geometry approaches a venturi style system. It is preferred to have a sharper edge from the edge to the hole. It is an object of the present invention to make the edge sharper with a grinder. It is an object of the present invention for the fill plate to be chrome coated on the side adjacent to the stripper plate with a material significantly harder than the fill plate material. This is because the stripper plate wears out. The piece is approximately 39 Rockwell C. It becomes approximately 60-65 Rockwell C. It is an object of the present invention for the material to be applied in a thickness to facilitate a surface which cuts the food product upon movement of a stripper plate. The material goes from about $1/1000^{th}$ of an inch to about $10/1000^{th}$ of an inch with the chrome. A cutting hemisphere into bottom of plate, with a cylinder.

It is an object of the present invention for the stripper plate to be interposed in the fill passage immediately adjacent to the fill plate. It is an object of the present invention for the stripper plate to be movable between the fill and discharge locations. It is an object of the present invention for the stripper plate to have a multiplicity of fill openings aligned one-for-one with the fill orifices in the fill plate when the stripper plate is in fill position. It is an object of the present invention for the stripper plate drive to be synchronized with the mold plate drive, such that the movement of the stripper plate facilitates the cutting of the meat product, which was pushed through the fill plate by the food pump. It is an object of the present invention for the stripper plate drive to move the stripper plate to its discharge position, in each mold cycle, before the mold plate moves appreciably toward the discharge location. It is an object of the present invention for the stripper plate drive to maintain the stripper plate in the discharge position until the mold plate cavity is displaced beyond the fill orifices.

It is an object of the present invention for the fill paths to be in a direction to the front, vertical or rear of the machine. It is an object of the present invention for all fill paths to consist of a hemispherical shape which is intersected by a cylindrical shape at an angle less or equal to about +/−75 degrees of vertical, and preferably about +/−45 degrees of vertical.

It is an object of the present invention to have a spherical hemisphere or curved structure which has a diameter which is no greater than the choke flow for the liquid gas or solid used and is no less than the diameter of the connected cylindrical portion to create conditions to meat flow which maintain improved cell structure.

It is an object of the present invention to use spherical geometry, with cylindrical intersections, and the ratio of the diameter of the sphere divided by the area of the cylinder to be approximately 1.1 to 2.5 to create conditions to meat flow which maintain improved cell structure.

Irregular shapes do not have diameters, but they do have areas. For a given ratio of a linear item, the ratio becomes the square of the linear ratio. For curved and irregular shapes, the ratio of the initial area and the reduced area is from approximately 1.2 to 6.25.

It is an object of the present invention to provide a venturi effect in the hole by creating a sphere to cylinder hole. This creates a venturi effect or a venturi pump. This accelerates the product through the hole. It is an object of the present invention for this to be used in a fill plate.

It is an object of the present invention to provide a venturi effect in the hole by creating a sphere to cylinder hole. This creates a venturi effect or a venturi pump. This accelerates the product through the hole. It is an object of the present invention for this to be used in a stripper plate.

It is an object of the present invention to provide a venturi effect in the hole by creating a sphere to cylinder hole. This creates a venturi effect or a venturi pump. This accelerates the product through the hole. It is an object of the present invention for this to be used in a breather plate.

BRIEF DESCRIPTION OF DRAWINGS

FIG. 6 is a side view of the breather plate design of the present invention.

FIG. 7 is a view of a single hole of the breather plate design of the present invention.

DETAILED DESCRIPTION

Figure 1:
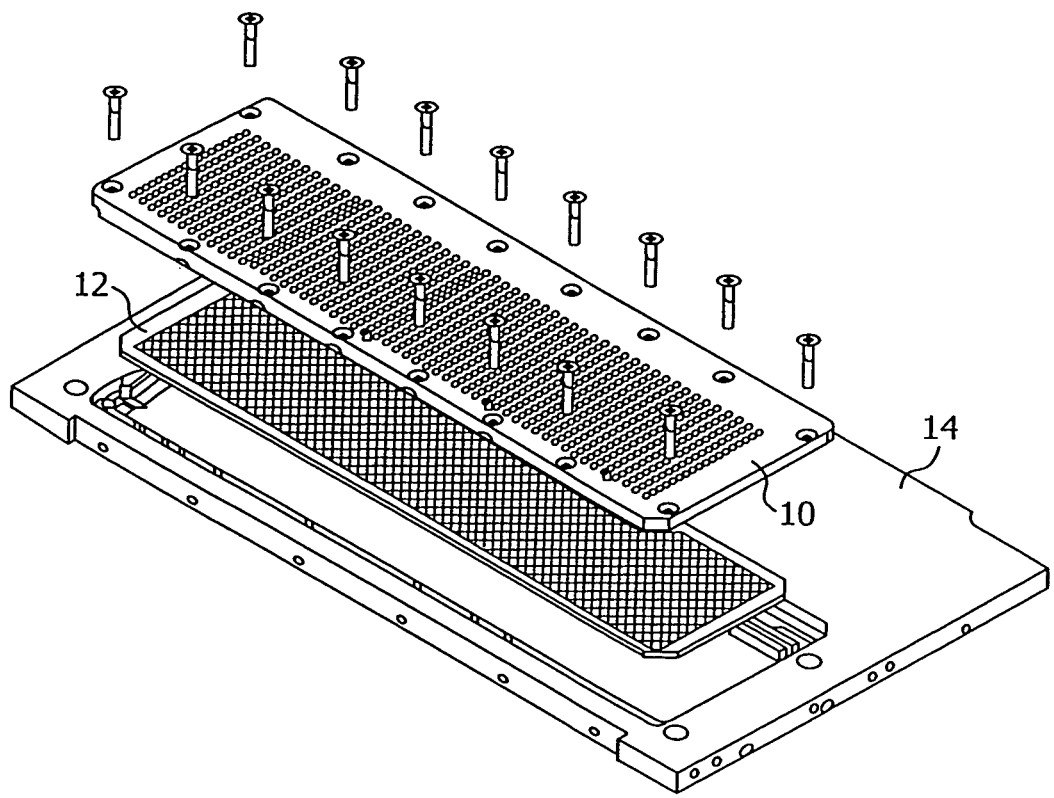
FIG. 1 is an unassembled view of a fill plate and stripper plate of the present invention.

FIG. 1 shows an unassembled view of a fill plate 10, stripper plate 12 and a top plate 14.

Figure 2:
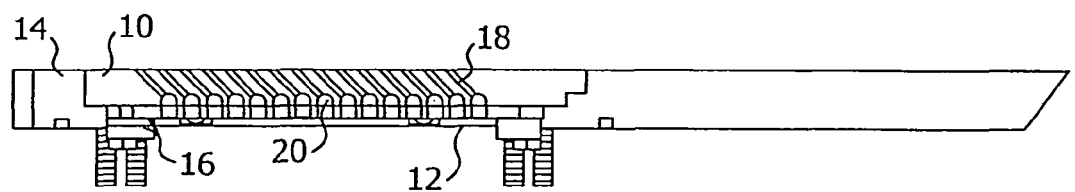
FIG. 2 is an assembled view of a fill plate and stripper plate of the present invention.

FIG. 2 shows an assembled view of the fill plate 10, stripper plate 12 and top plate 14, further comprising a stripper plate spacer and hold down 16, a cylindrical section 18 and a curved section 20.

Figure 3:
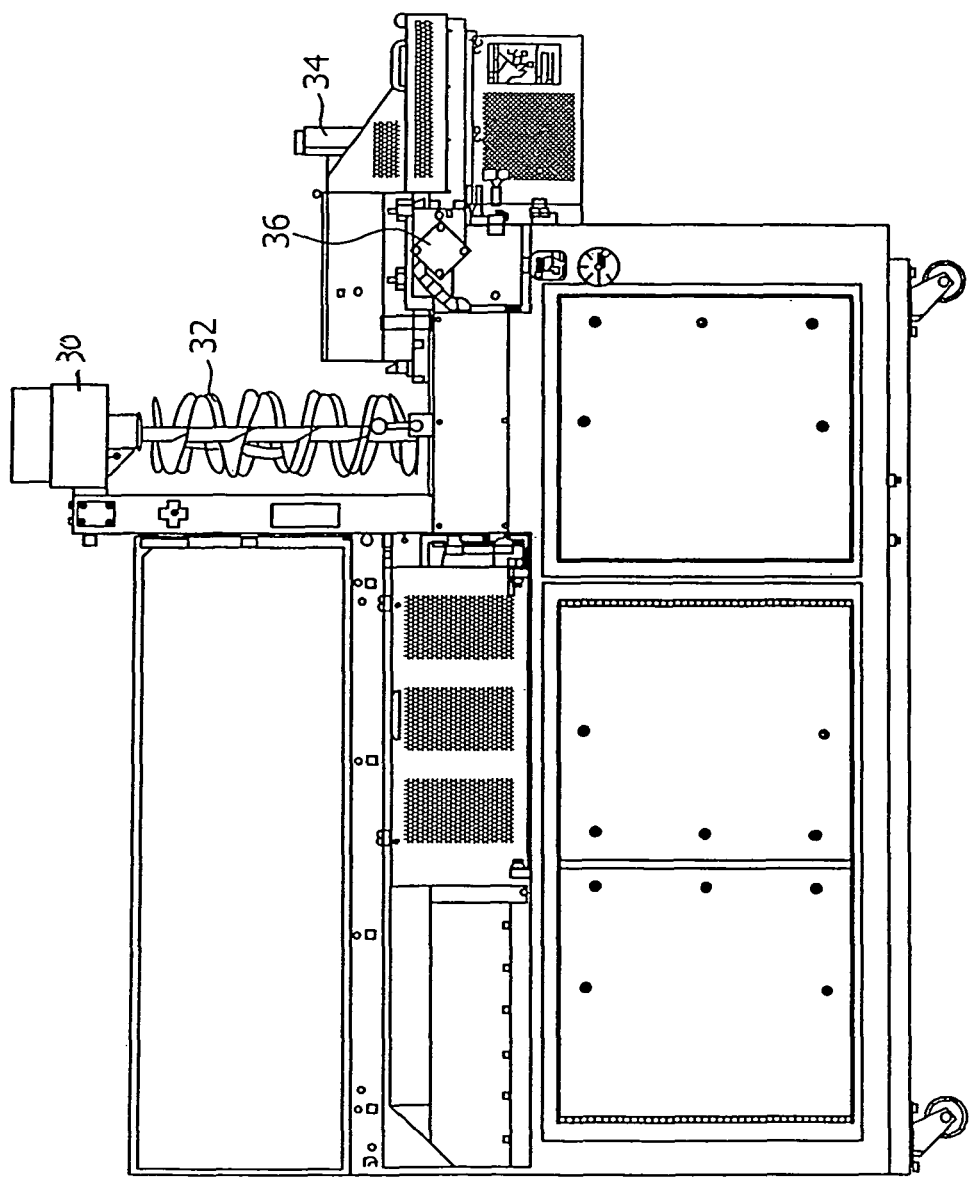
FIG. 3 shows a side view of an embodiment of the invention.

FIG. 3 shows a side view of the patty molding machine having an auger driver motor 30 an auger 32, knockouts 34 and a shear plate drive cylinder 36.

Figure 4:
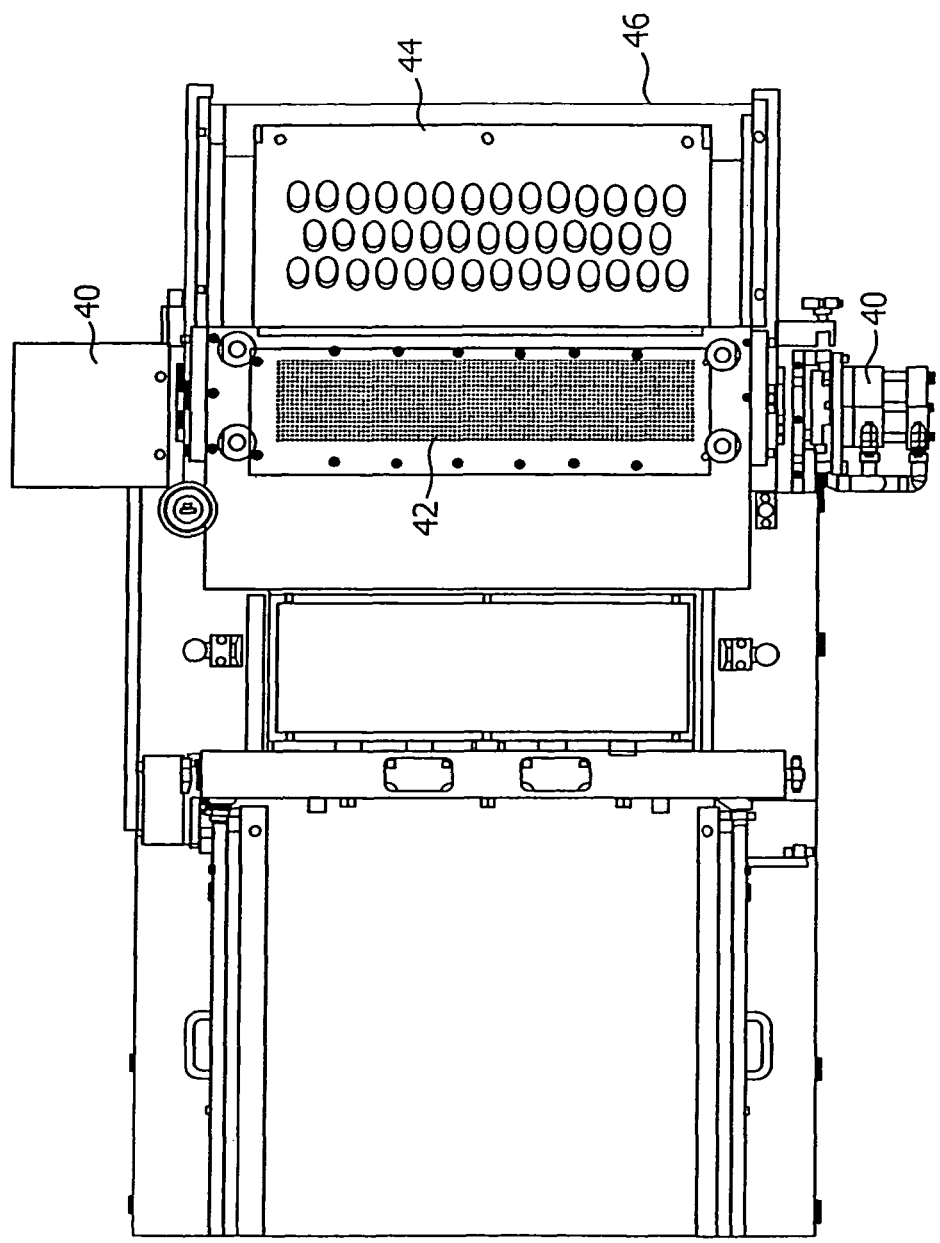
FIG. 4 shows a top view of an embodiment of the invention.

FIG. 4 shows a top view of an embodiment of the present invention, having a stripper plate drive 40, a fill and stripper plate assembly 42, a mold plate 44 and a draw bar 46.

Figure 5:
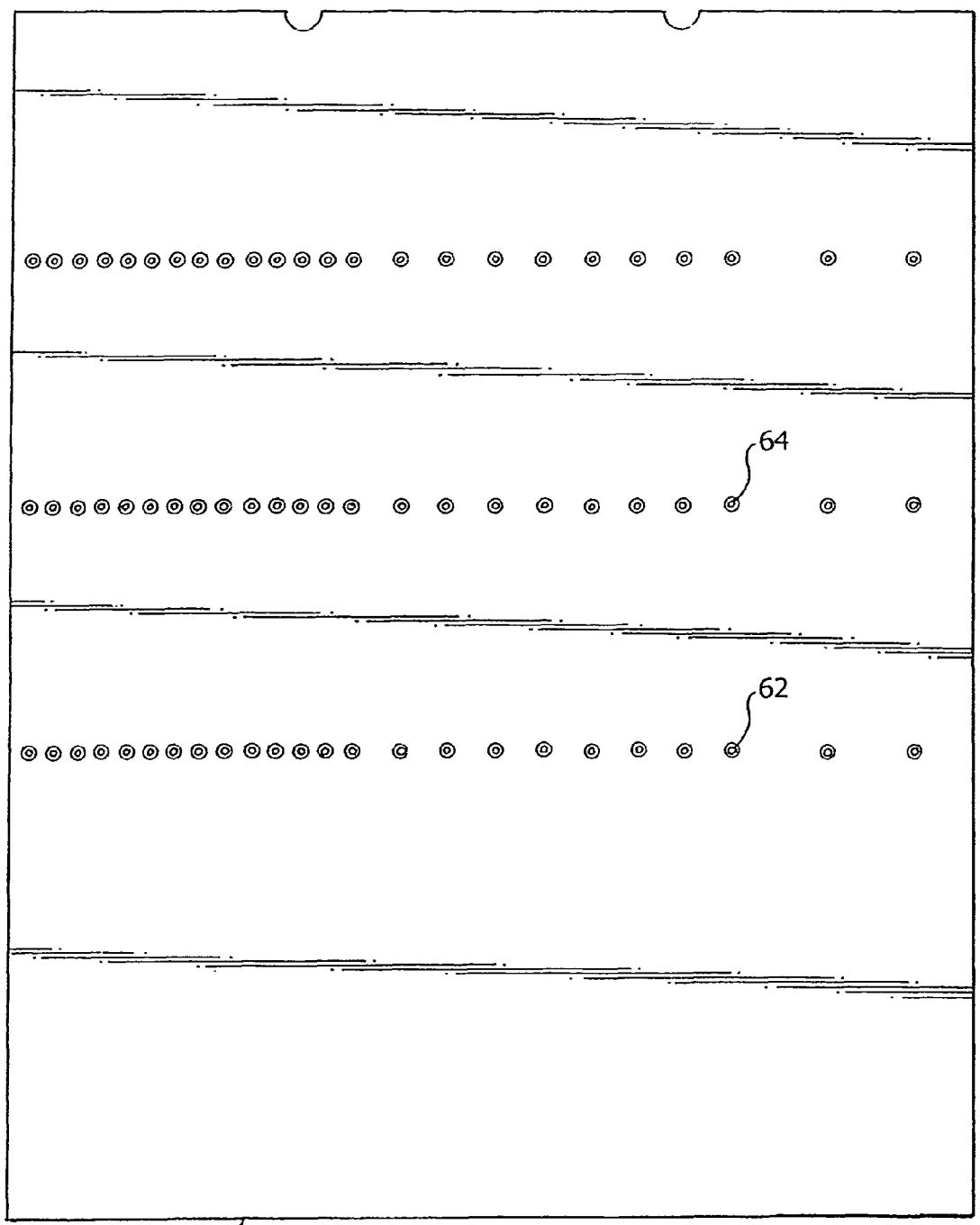
FIG. 5 is a top view of the breather plate design of the present invention.

FIG. 5 shows a breather plate 60 having orifices 62 and 64 in the breather plate 60.

FIG. 6 shows the breather plate 70 having orifices 72 and 74. The channels are made up of a spherical section 76 intersecting a cylindrical section 78.

FIG. 7 further shows the orifice 74 having the spherical section 76 and a cylindrical section 78.

Figure 8:
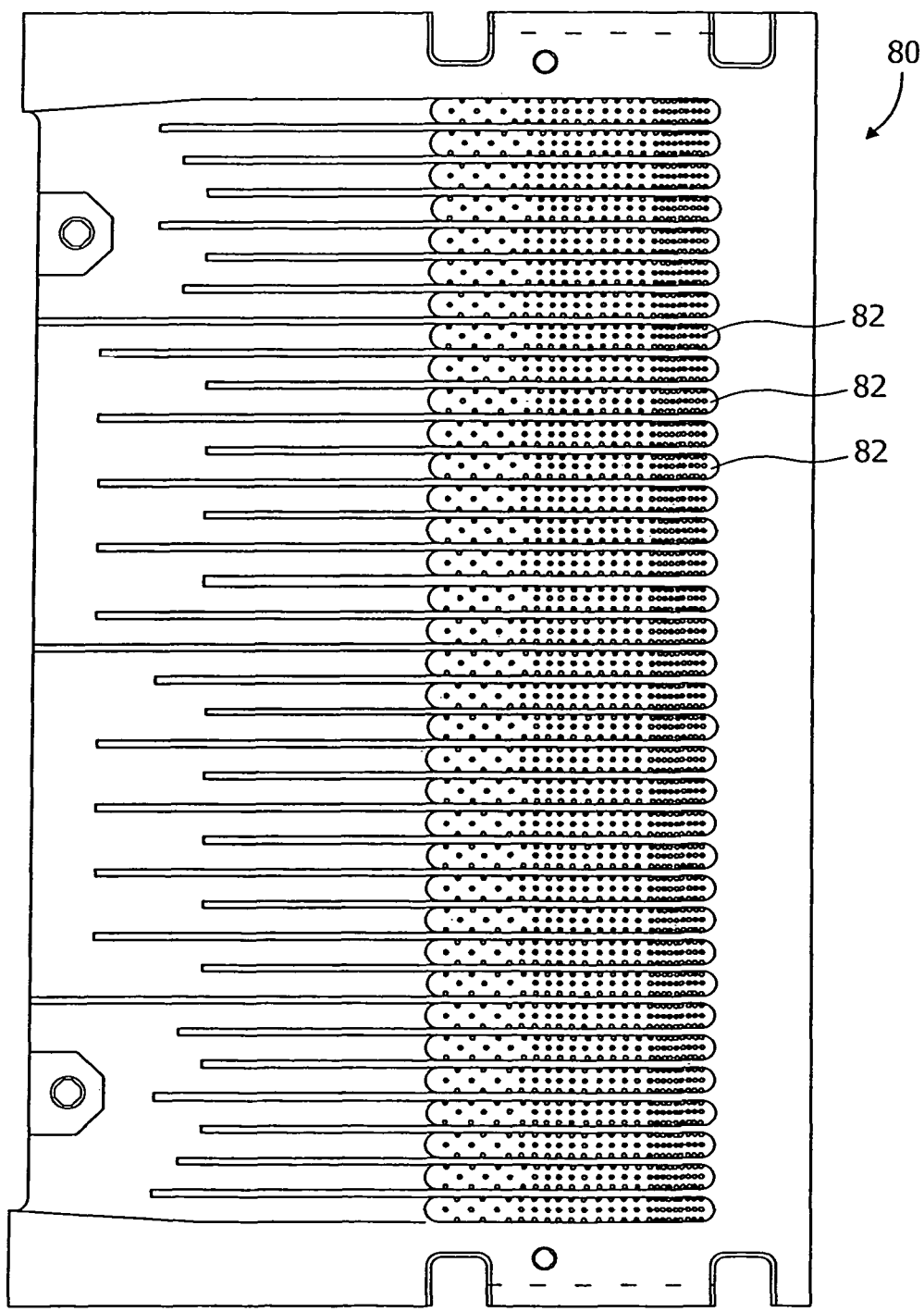
FIG. 8 is a top view of the breather plate design of the present invention.

FIG. 8 shows the breather plate 80 having the orifices 82.

Figure 9:
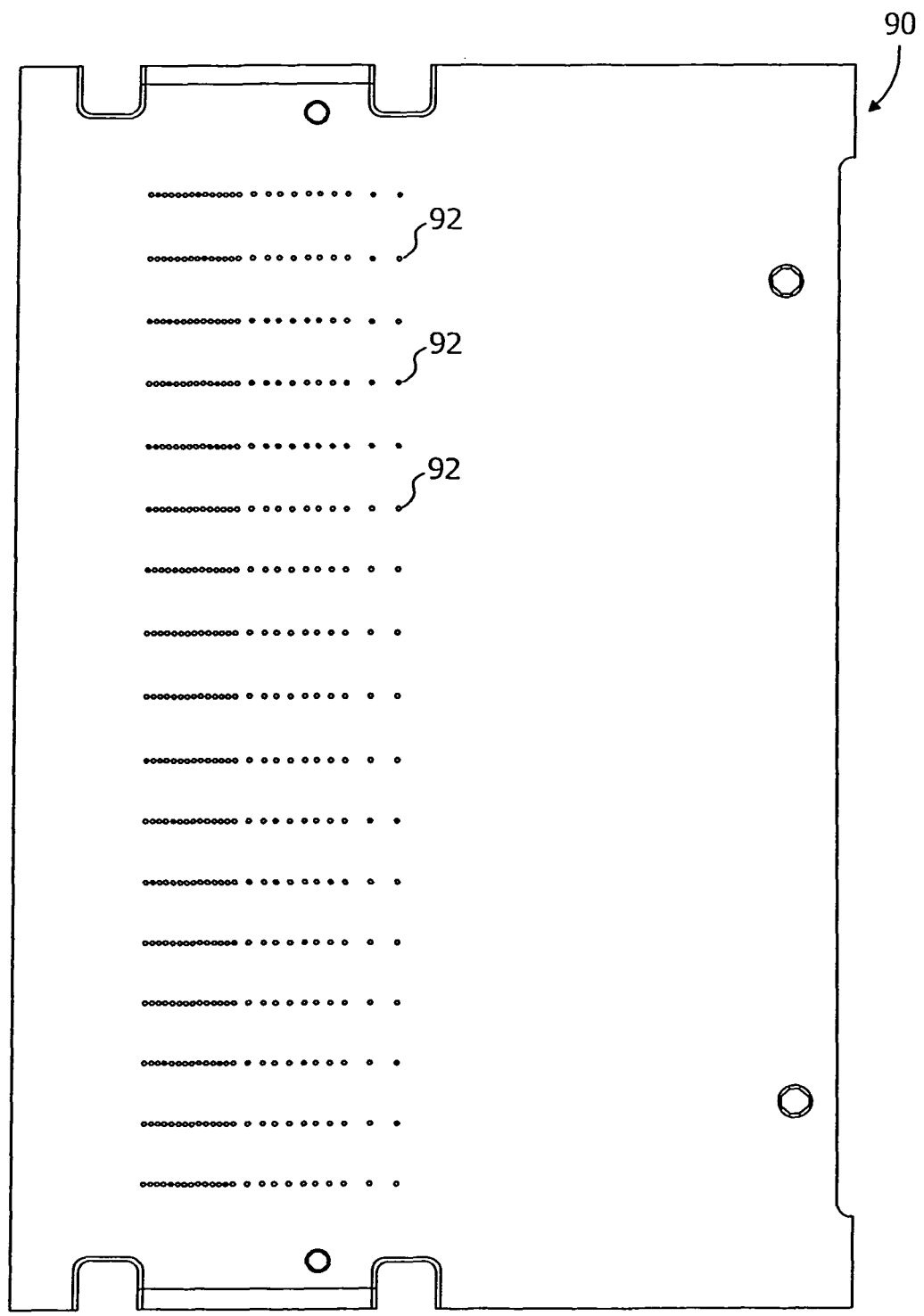
FIG. 9 is a top view of the breather plate design of the present invention.

FIG. 9 shows the breather plate 90 having the orifices 92.

Figure 10:
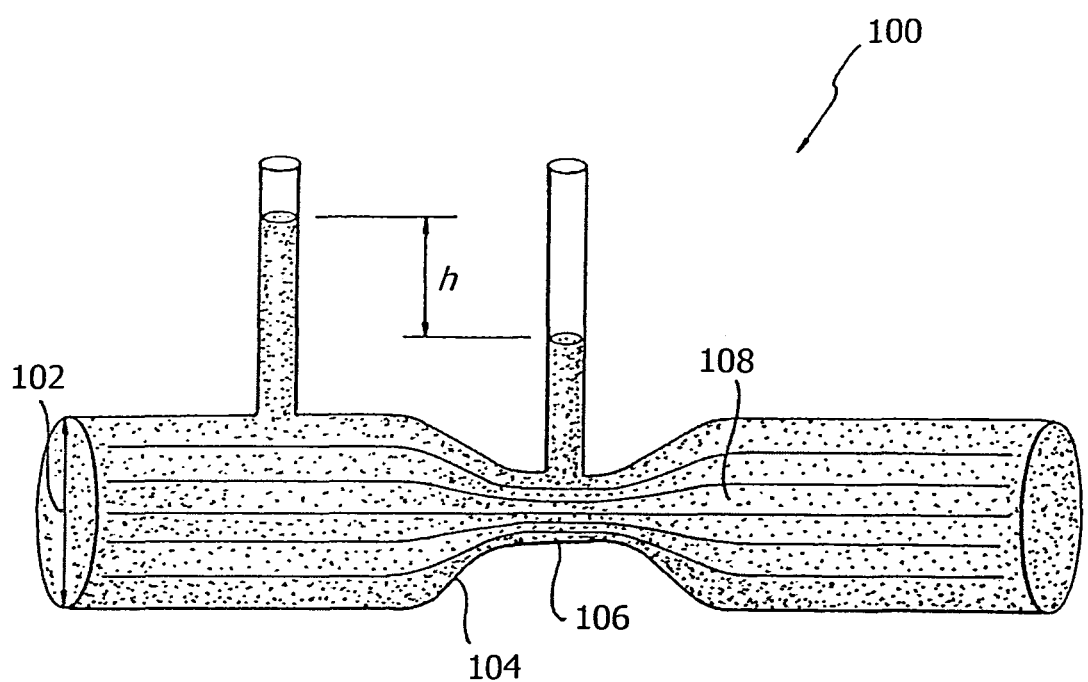
FIG. 10 is an illustration of a venturi.

FIG. 10 shows a venturi 100 comprising a diameter 102 angle transition 104, throat length 106 and discharge 108.

The present invention relates to fiber orientation technology. The fiber orientation technology drops pressure across the fill plate, aligns the fibers of meat so that the contraction of the muscle fiber that does take place is in a direction of choice controlling both bite and shrinkage. The fiber orientation technology provides a lower resistance to product flow using a venturi.

The fiber orientation technology provides a better shear surface for a cleaner cut. The fiber orientation technology aligns the fibers in the fill hole so the shearing action disrupts as few muscle cells as possible. The fiber orientation technology decreases the total area of metal fill plate blocking the meat flow resulting in less direction change to the product which works the meat. The fiber orientation technology pulls the meat fiber through the fill hole instead of pushing using the principles of the venturi.

All of these characteristics of fiber orientation technology reduce the release and mixing of myosin with actin, the net effect is a controlled orientation of the fiber, less myosin activity resulting in a better bite/bind and control over the final cook shape.

Spherical geometry in fill or stripper plate creates venturi effects.

A food molding machine has a mold plate and at least one mold cavity therein. A mold plate drive is connected to the mold plate for driving the mold plate along a given path, and a repetitive cycle, between a fill position and a discharge position. A food pump pumps a moldable food product through a fill passage connecting the food pump to the mold cavity when the mold plate is in the fill position. A fill plate, interposed in the fill passage immediately adjacent to the mold plate has a fill slot, fill horn, or multiplicity of fill orifices distributed in a predetermined pattern throughout an area aligned with the mold cavity when the mold plate is in fill position. The fill orifices define paths through the fill plate, wherein some of the paths each have a path portion obliquely angled or perpendicular to the fill side of the mold plate. The paths consist of spherical intersections or a curved structure. In an embodiment, the side of the fill plate which is in contact with the stripper plate consists of a spherical hemisphere or curved structure has a diameter which is no greater than the choke flow for the liquid gas or solid used and is no less than the diameter of the connected cylindrical portion. In an embodiment, the side of the fill plate which is in contact with the stripper consists of a spherical hemisphere or curved structure which has a diameter approximately 1.1 to 2.5 times greater than a cylindrical portion which intersect the top of the mold plate perpendicularly or at an angle of less than or equal to about +/−75 degrees, or about +/−45 degrees in a preferred embodiment as measured from vertical in the longitudinal direction of the mold plate. By a reduction in the cross-sectional area a "venturi" condition is created. By using spherical sections or a curved structure, intersections between cylinder and spheres or curved structures create transitions which can be manufactured whose geometry approaches a venturi style system. It is preferred to have a sharper edge from the edge to the hole. To get a perfect edge it is preferred to sharpen with a grinder.

In a preferred embodiment, the fill plate is chrome coated on the side adjacent to the stripper plate with a material significantly harder than the fill plate material. This is because the stripper plate wears out. The piece is approximately 39 Rockwell C. It becomes approximately 60-65 Rockwell C. The material is applied in a thickness to facilitate a surface which cuts the food product upon movement of a stripper plate. The material goes from $\frac{1}{1000}^{th}$ of an inch to about $\frac{10}{1000}^{th}$ of an inch with the chrome. A cutting hemisphere into bottom of plate, with a cylinder.

A stripper plate is interposed in the fill passage immediately adjacent to the fill plate. The stripper plate is movable between the fill and discharge locations. The stripper plate has a multiplicity of fill openings aligned one-for-one with the fill orifices in the fill plate when the stripper plate is in fill position. A stripper plate drive is synchronized with the mold plate drive, such that the movement of the stripper plate facilitates the cutting of the meat product, which was pushed through the fill plate by the food pump. The stripper plate drive moves the stripper plate to its discharge position, in each mold cycle, before the mold plate moves appreciably toward the discharge location. The stripper plate drive maintains the stripper plate in the discharge position until the mold plate cavity is displaced beyond the fill orifices.

The fill paths can be in a direction to the front, vertical or rear of the machine. All fill paths consist of a hemispherical shape which is intersected by a cylindrical shape at an angle less or equal to about +/−75 degrees of vertical, and preferably about +/−45 degrees of vertical.

The use of spherical geometry, with cylindrical sections wherein the spherical hemisphere or curved structure which has a diameter which is no greater than the choke flow for the liquid gas or solid used and is no less than the diameter of the connected cylindrical portion creates conditions to meat flow which maintain improved cell structure.

The use of spherical geometry, with cylindrical intersections, and the ratio of the diameter of the sphere divided by the diameter of the cylinder is approximately 1.1 to 2.5 creates conditions to meat flow which maintain improved cell structure.

In FIG. 10 a fluid enters at the left end of the tube. Using conservation of mass and conservation of energy principles the volume rate of flow must be equal at all points in the systems. $(\rho_1 A_1 V_1) = (\rho_2 A_2 V_2)$. Since $\rho$ is a constant, velocity is inversely proportional to cross sectional area. Also, a venturi requires a ramp of some finite distance and a throat which also has a finite distance.

A spherical geometry feeding into a circular cross section creates a product velocity increase while maintaining more consistent pressure on the food product. A sphere has the following properties:

All points on a sphere are the same distance from a fixed point.
Contours and plane sections of spheres are circles.
Spheres have the same width and girth.
Spheres have maximum volume with minimum surface area.
These properties allow food products to flow with minimum interruptions. There are no static or dead zones.
No matter what angle the cylinder intersects the sphere; the cross section is always a perfect circle.
Pressure inside of a sphere is uniform in all directions.

When food product is passed through a circular cross section of a sphere, the fact that pressure is uniform in a sphere creates forces which will be coaxial with the sphere. The reduction in area accelerates the food product through the cylindrical section of the fill plate. The acceleration has been shown empirically to align fibers in the primary direct of flow. Hence, there is fiber orientation.

The invention claimed is:

1. A food product molding machine comprising:
a mold plate and at least one mold cavity therein;
a mold plate drive connected to said mold plate
a food pump for pumping a moldable food product through a fill passage connecting said food pump to said mold cavity when said mold plate is in fill position;
a fill plate, interposed in said fill passage adjacent to said mold plate;
a breather plate;
multiplicity of breather plate orifices distributed in a predetermined pattern throughout an area of said breather plate;
said orifices comprising a sphere connected to a cylinder wherein said sphere is a constriction from a fixed point where a distance of said constriction is equidistant from said fixed point.

2. A food product molding machine, comprising: a mold plate having at least one mold cavity therein, along a given path, in a repetitive cycle, between a fill position and a discharge position; food pump for pumping a moldable food product; a fill passage connecting said food pump to said mold cavity when said mold plate is in said fill position; a fill plate, interposed in said fill passage adjacent to said mold plate; said fill plate having a fill slot, fill horn, or multiplicity of fill orifices distributed in a predetermined pattern throughout an area aligned with said mold cavity when said fill plate is in its fill position; said fill orifices defining paths through said fill plate; said fill orifices comprising a sphere intersecting a cylinder which creates a venturi orifice; wherein said sphere is a constriction from a fixed point where a distance of said constriction is equidistant from said fixed point; a stripper plate interposed in said fill passage adjacent side of said fill plate opposite said mold plate, and movable along a path transverse to said mold plate path between said fill location and discharge position; said stripper plate having a multiplicity of fill openings aligned one-for-one with said fill orifices as extensions thereof when said stripper plate drive is in said fill location; and stripper plate drive, synchronized with said mold plate drive between its fill location and discharge location.

3. The food product molding machine of claim 2, wherein said moldable food product comprises meat.

4. The food product molding machine of claim 2, wherein said fill plate reduces release and mixing of myosin with actin in said moldable food product.

5. The food product molding machine of claim 2, wherein said fill plate controls orientation of fiber in said moldable food product.

6. The food product molding machine of claim 2, wherein said fill plate provides less myosin activity resulting in a better bite/bind and control over final cook shape of said moldable food product.

7. The food product molding machine of claim 2, wherein said fill plate accelerates food product in order to cause said moldable food product to be stretched aligning fibers of said food product.

8. The food product molding machine of claim 2, wherein said fill orifices change size from a larger to a smaller diameter with vertical or concave sides.

9. The food product molding machine of claim 2, wherein said venturi orifice results in food product acceleration with a corresponding pressure drop through said venturi orifice.

* * * * *